(12) United States Patent
Chen

(10) Patent No.: US 11,543,640 B2
(45) Date of Patent: Jan. 3, 2023

(54) CONFOCAL OPTICAL SYSTEM AND COMPONENTS THEREOF

(71) Applicant: Laxco Incorporated, Mill Creek, WA (US)

(72) Inventor: Congliang Chen, Bothell, WA (US)

(73) Assignee: Laxco Incorporated, Mill Creek, WA (US)

( * ) Notice: Subject to any disclaimer, the term of this patent is extended or adjusted under 35 U.S.C. 154(b) by 284 days.

(21) Appl. No.: 16/854,453

(22) Filed: Apr. 21, 2020

(65) Prior Publication Data
US 2021/0325650 A1    Oct. 21, 2021

(51) Int. Cl.
*G02B 21/00* (2006.01)
(52) U.S. Cl.
CPC ..... *G02B 21/0044* (2013.01); *G02B 21/0068* (2013.01); *G02B 21/0076* (2013.01)
(58) Field of Classification Search
None
See application file for complete search history.

(56) References Cited

U.S. PATENT DOCUMENTS

| | | | |
|---|---|---|---|
| 2010/0085537 A1* | 4/2010 | Ramella-Roman | A61B 5/14555 359/619 |
| 2013/0229493 A1* | 9/2013 | Ikuta | G02B 21/32 348/46 |
| 2015/0234178 A1* | 8/2015 | Azuma | G02B 26/10 359/201.2 |
| 2016/0161728 A1* | 6/2016 | Sangu | G02B 27/58 359/203.1 |
| 2016/0320596 A1* | 11/2016 | Hayashi | G02B 21/0044 |
| 2017/0038573 A1* | 2/2017 | Uhl | G02B 21/0044 |
| 2017/0276608 A1* | 9/2017 | Kanarowski | G02B 21/0032 |

\* cited by examiner

*Primary Examiner* — Derek S. Chapel
(74) *Attorney, Agent, or Firm* — Lee & Hayes, P.C.

(57) ABSTRACT

A confocal optical system includes a light source and a spinning polarizer disposed in the optical pathway such the light emitted from the light source passes through the spinning polarizer. A first objective lens is disposed in the optical pathway to allow passage of light that passes through the spinning polarizer. A microlens array member is disposed adjacent the first objective lens to receive light. The microlens array member includes a plate having a plurality of holes arranged in an array pattern. A second objective lens is disposed in the optical pathway to receive and allow passage of light to a sample. The optical pathway is arranged such that, after reaching the sample, the light is directed back through the second objective lens, the microlens or microlens with filter array, and the first objective lens and a fluorescent filter cube as an emission beam to reach at least one camera which provides an image of the sample.

20 Claims, 10 Drawing Sheets

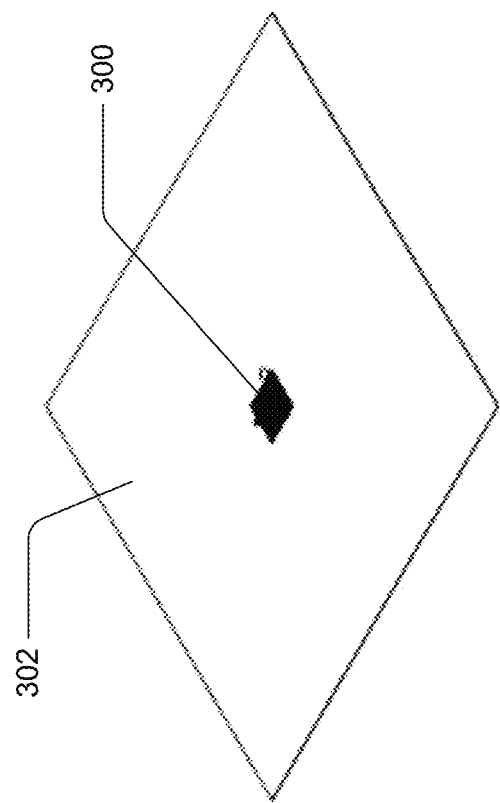
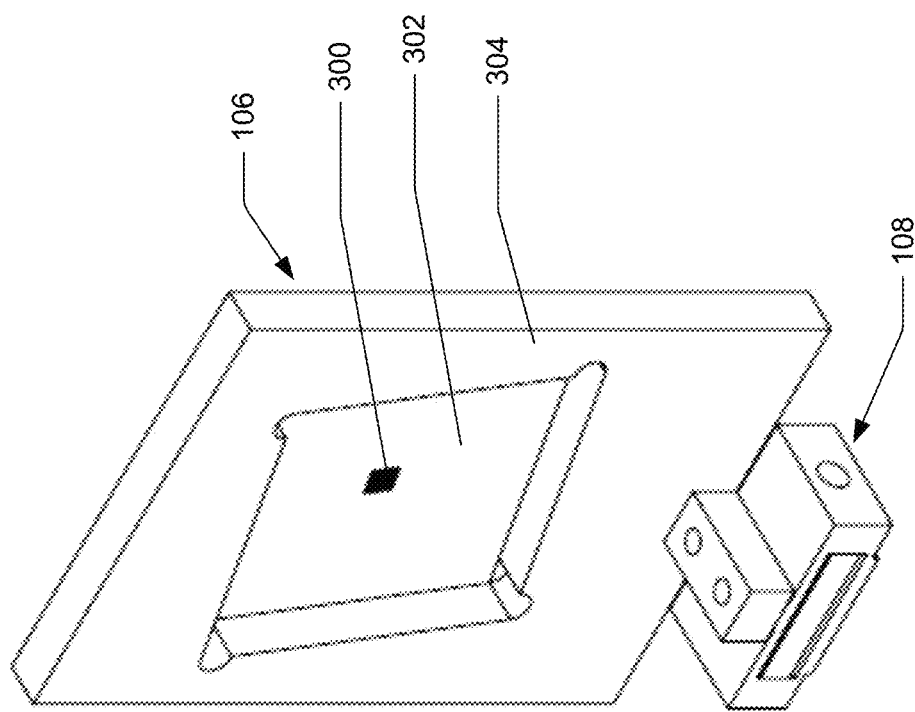
FIG. 3B
FIG. 3A

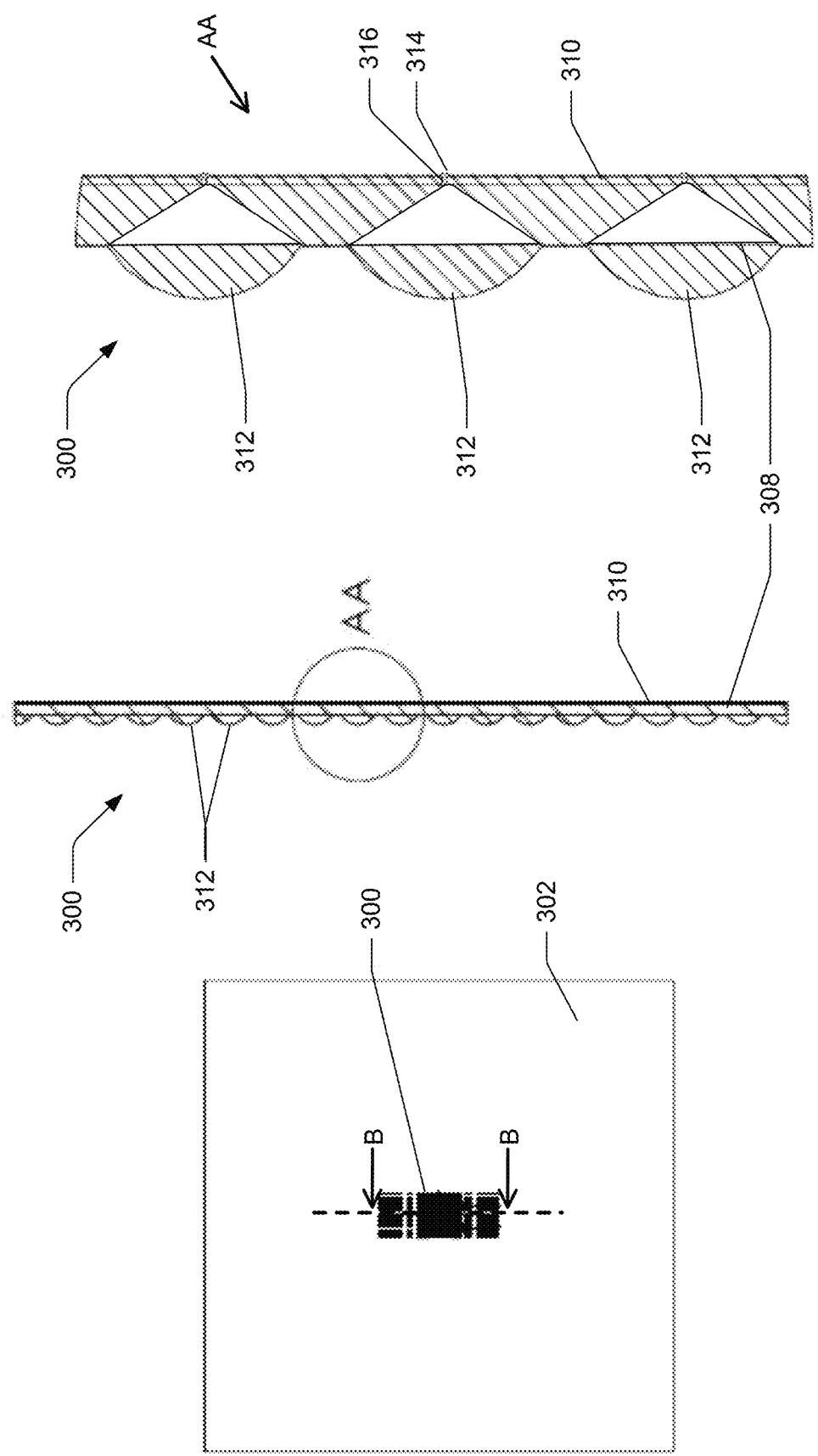

CONFOCAL OPTICAL SYSTEM AND COMPONENTS THEREOF

BACKGROUND

While many improvements have been made over time in the arena of confocal microscopy, including the advancements made with the spinning disk microscope, there remains a desire to constantly improve speed of obtaining the images and increasing the quality of the images. Additional background information on the advancements may be found at http://zeiss-campus.magnet.fsu.edu/articles/spinningdisk/introduction.html.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items. Furthermore, the drawings may be considered as providing an approximate depiction of the relative sizes of the individual components within individual figures. However, the drawings are not to scale, and the relative sizes of the individual components, both within individual figures and between the different figures, may vary from what is depicted. In particular, some of the figures may depict components as a certain size or shape, while other figures may depict the same components on a larger scale or differently shaped for the sake of clarity.

FIG. 3A illustrates an isometric view of a piezoelectric control driver with a microlens array member according to an embodiment of this disclosure.

FIG. 3B illustrates an isometric view of the microlens array member of FIG. 3A according to an embodiment of this disclosure.

FIG. 3C illustrates a planar view of the microlens array member of FIG. 3B according to an embodiment of this disclosure.

FIG. 3D illustrates a cross-sectional view of a portion of the microlens array member in FIG. 3C according to an embodiment of this disclosure.

FIG. 3E illustrates a detail perspective of the cross-sectional view of the microlens array member in FIG. 3D according to an embodiment of this disclosure.

DETAILED DESCRIPTION

Overview

This disclosure is directed to a confocal optical system to implement in the optical path of a confocal microscope. In an embodiment, the system described herein may be equipped as a dual microscope design to achieve high quality images at a magnification level upwards of 10,000×. Various components discussed herein below may assist in achieving such magnification at high quality and/or generally improve the confocal optical system. For example, the confocal optical system may include a piezoelectric ("piezo") drive controller coupled to a microlens array member that minimizes diffraction of the light while enhancing the visibility. Thus, the piezo drive controller provides highly sensitive and rapid control movements of the microlens array member.

Additional improvements to the system and componentry thereof are discussed further herein below. Nevertheless, it is noted that each of the aspects described herein are considered to be individually, patentably distinct, and that a system incorporating one or more of the features and aspects of the disclosure is therefore also considered to be patentably distinct. Accordingly, various embodiments of a confocal optical system are considered herein for patentability with various implementations of the features herein described, as well as individual components or aspects of the considered systems.

Moreover, in some instances, a specific value or a range of values for a dimension is provided for various components hereinafter. In those instances where a specific value or range of values is given, the terms "about" x-value or "approximately" x-value may be used. In such instances, one skilled in the art may determine based on the relative scale that the terms "about" or "approximately" may mean that the actual value may deviate within 5% or 10% of the stated value.

Figure 1:
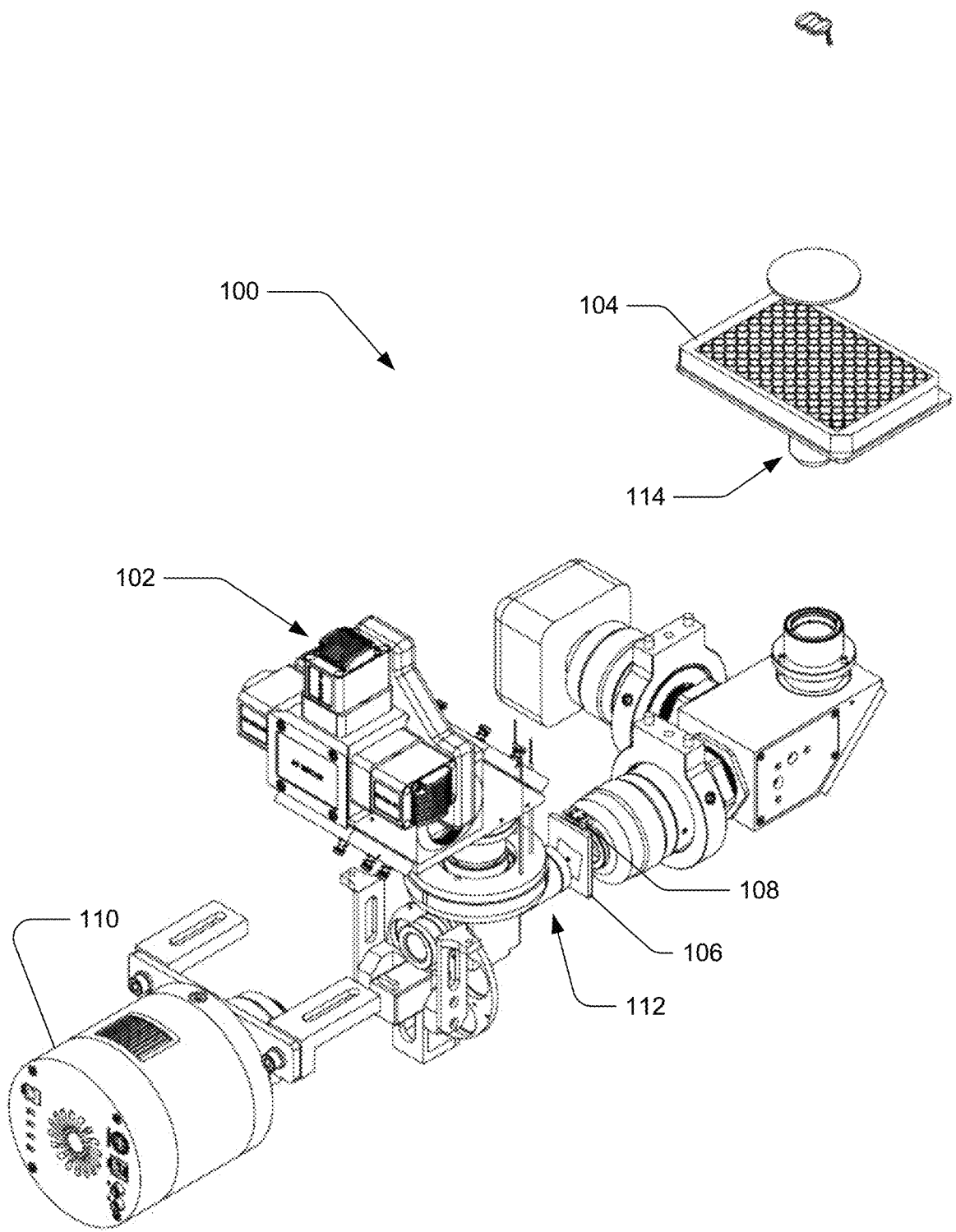
FIG. 1 illustrates an isometric view of a confocal optical system according to an embodiment of the disclosure.

Illustrative Embodiments of a Confocal Optical System and Components Thereof FIG. 1 depicts a confocal optical system 100 according to an embodiment of the disclosure. In particular, confocal optical system 100 may include a light source 102 to illuminate a sample 104 for observation. An LED or a laser may be used in an embodiment for light source 102. Upon activation of the confocal optical system 100, the light from light source 102 may pass through a solitary microlens array member 106 to reach sample 104 (as an excitation beam) and the light (as an emission beam) may be routed to pass again through the same microlens array member 106 upon return from sample 104.

A piezo drive controller 108 may be coupled with microlens array member 106 to provide highly accurate, rapid movement of microlens array member 106. In an embodiment, piezo drive controller 108 may be coupled to an upper portion of microlens array member 106 and be configured to shift microlens array member 106 in a vertical direction. Nevertheless, additional structural orientations are considered beyond coupling to the upper portion of microlens array member 106. Piezo drive controller 108 may be coupled to shift microlens array member 106 in a range from about 1 micron to 800 microns or more, according to the particular design needs of an optical system.

A camera 110 may be implemented in confocal optical system 100 to capture the light emission beam so as to provide the magnified image of sample 104 as desired. As discussed further herein, one or more cameras may be implemented to suit desired purposes and enhance imagery. It is contemplated that cameras implemented may include CCD cameras or other suitable camera having technological capabilities of capturing and outputting images of the samples as required by a user.

Confocal optical system 100 may further include a first objective lens 112 and a second objective lens 114. First objective lens 112 may be disposed adjacent a side of microlens array member 106 so as to be positioned between light source 102 and microlens array member 106. Second objective lens 114 may be disposed adjacent sample 104 so as to be positioned between sample 104 and microlens array member 106. That is, in an embodiment with two objective lenses, there is an objective lens (112, 114) on both sides of microlens array member 106.

Figure 2A:
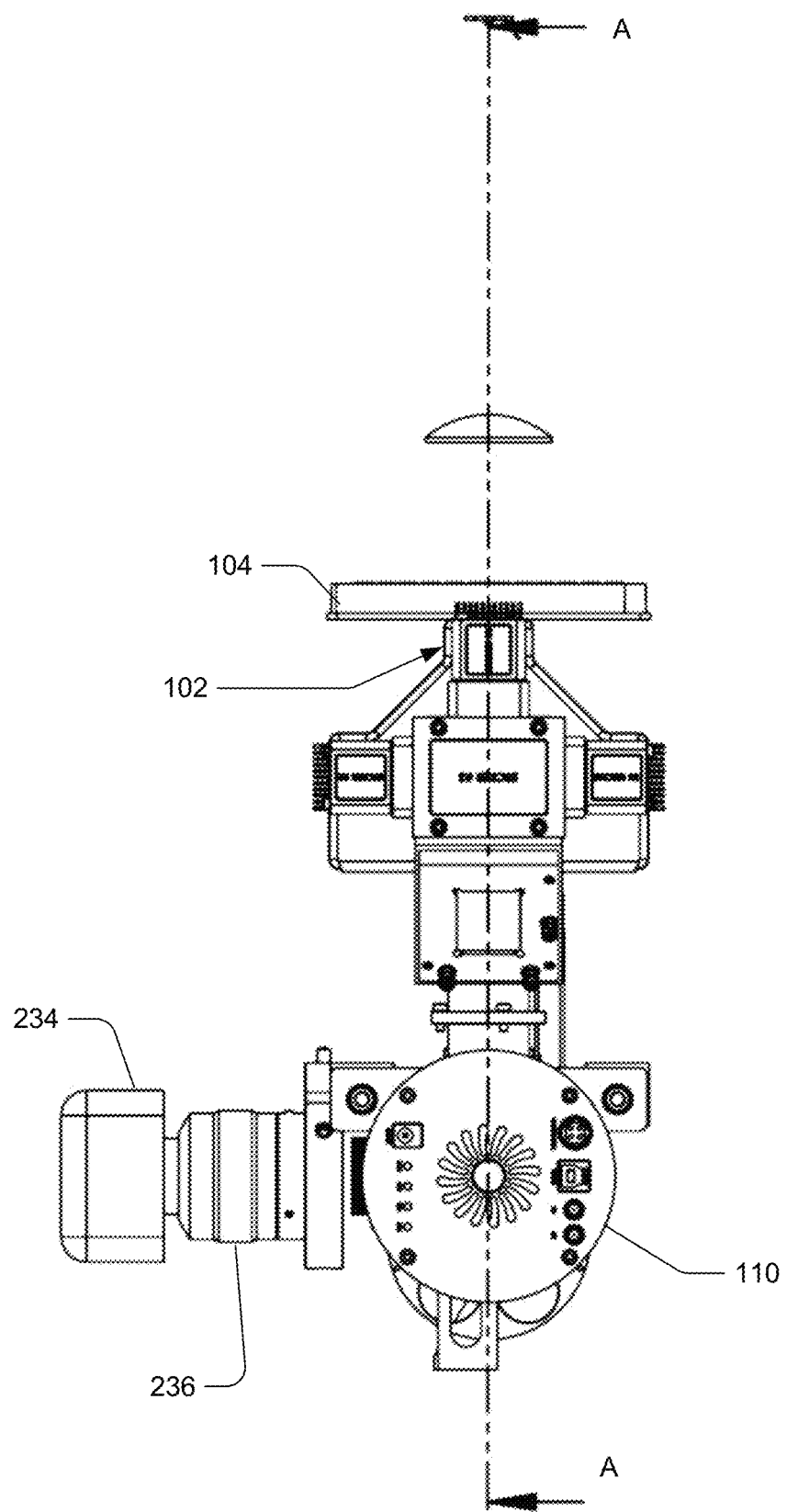
FIG. 2A illustrates an end view of the confocal optical system in FIG. 1 according to an embodiment of this disclosure.
Figure 2B:
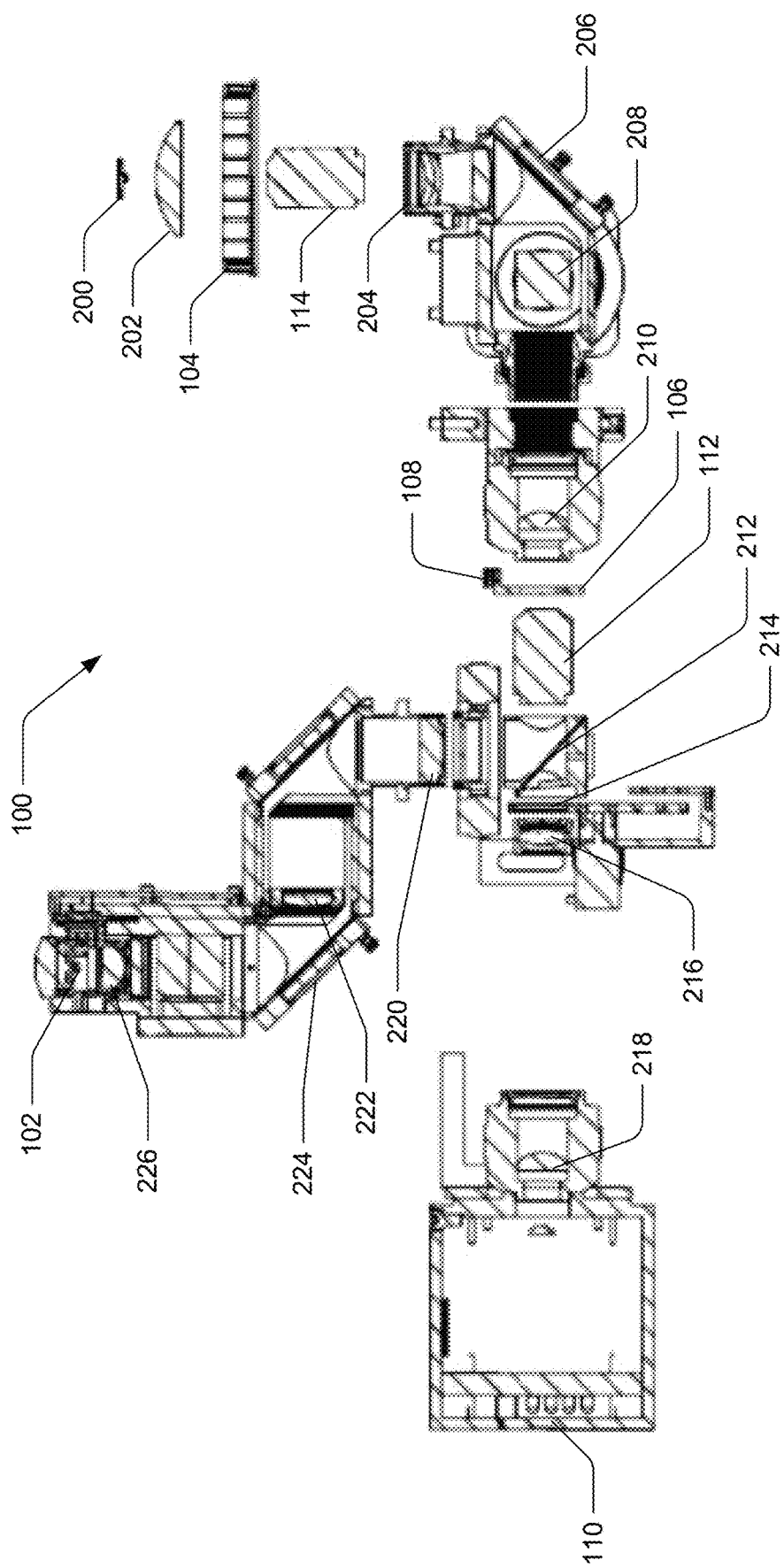
FIG. 2B illustrates a cross-sectional view of the confocal optical system in FIG. 2A according to an embodiment of this disclosure.

For the sake of visual reference and representation, FIG. 2A depicts confocal optical system 100 from an end view, looking at confocal optical system 100 from a direct planar perspective of camera 110. As such, FIG. 2B depicts the cross-sectional view of confocal optical system 100 at line A-A in FIG. 2A. In an embodiment, additional components and/or features, as depicted in FIGS. 2A and 2B, which may be incorporated in an optical pathway of confocal optical system 100 include: an upper light source 200; a condenser lens 202; a tube cell lens (imaging lens) assembly 204 having a mirror 206, a beam splitter 208, and a reducing lens 210; a multi-channel beam splitter 212; an emission filters wheel 214; a tube lens 216 (imaging lens); a reducing lens 218; a relay lens 220; a relay lens 222; a mirror 224; a convergence lens 226; a mirror 228; a spinning polarizer 230; a motor 232 to spin the spinning polarizer 230; a bright field phase contrast camera 234; a reducing lens 236; etc. The precise list of additional components may vary according to the specific requirements of a particular design or user needs. Notably, as depicted, the optical pathway provides that light emitted from light source 102 passes through microlens array member 106 in a first direction and then is returned through the same solitary microlens array member 106 before reaching camera 110. As such, a confocal optical system 100 with features as described herein may be faster in producing a higher quality image, and at a greater magnitude, than known confocal optical systems.

In FIG. 3A, microlens array member 106 is depicted in a perspective view that is inverted from the orientation in which microlens array member 106 is depicted in FIGS. 1 and 2B. That is, in FIGS. 1 and 2B, microlens array member 108 is depicted as couple to microlens array member 106 on an upper portion of microlens array member 106. However, in FIG. 3A, microlens array member 106 and microlens array member 108 are depicted in a flipped orientation for convenience. Nevertheless, in other embodiments, microlens array member 108 may be coupled to microlens array member 106 in any suitable position to accommodate the needed movement of microlens array member 106 according to the particular design used for a confocal optical system having a lens array like microlens array member 106 described herein.

Within the following paragraphs, features of the microlens array member 106 are discussed. Although all of the features are implicitly depicted within more than one of FIGS. 3A-3I, due to the representation of the whole microlens array member 106 compared to the micro sized components within microlens array member 106, the features described herein may be better understood when viewing particular drawings. Nevertheless, some of the reference numbers regarding microlens array member 106 may be found only in one of FIGS. 3A-3I, while other reference numbers may show up in multiple figures of FIGS. 3A-3I.

Accordingly, microlens array member 106 includes a microlens array 300 ("array 300") of holes and lenses, each of which is described in greater detail below. Further, array 300 is disposed within an array area 302. Note, due to the intended micro size of the holes and accompanying lenses in the array 300, for FIGS. 3A-3C, neither the holes, nor the lenses are individually visible. Rather, as an array of clustered micro-sized holes and lenses, instead array 300 is depicted as a dark shape in approximately the center of array area 302, in FIGS. 3A-3C. Moreover, array area 302 may be further surrounded by a supporting peripheral body 304 to facilitate coupling of microlens array member 108 to effectively move array 300.

FIG. 3B depicts, for convenience, an isometric view of just array area 302 with array 300 such that supporting peripheral body 304 is not shown. Similarly, FIG. 3C illustrates a planar view of just array 300 in array area 302 as in FIG. 3B to provide a better understanding of the orientation of the cross-section shown in FIG. 3D, which is taken at line B-B. Furthermore, FIG. 3D is intended to capture only a portion of array 300, rather than including any proximate edges of array area 302.

In an embodiment, array 300 may be formed, at least in part, as a substantially planar layer 308 (or plate) of a fused silica material, for example, such that UV-IR frequencies of light all pass through the planar layer 308 at a high transmission rate. Alternatively, other materials may provide satisfactory results as well. In an embodiment, planar layer 308 may be approximately 10 µm in thickness or may range in thickness from about 5 µm to about 25 µm, or about 7 µm to about 18 µm, or about 10 µm to 12 µm, for example.

Additionally, planar layer 308 may include a coating layer 310 layered thereon. Coating layer 310 may be formed, at least in part, of an ABS material, for example. In an embodiment, the material of coating layer 310 may have properties to block light from UV to IR through the material. That is, coating layer 310 may be a material that allows IR and red light to pass, while blocking blue and green light. Alternatively, other materials may provide satisfactory results of light blocking and stability for laser cutting therethrough as well. In an embodiment, coating layer 310 may be approximately 2 to 3 µm in thickness or may range in thickness from about 0.5 µm to about 5 µm, for example, to provide a better light attenuation rate. Nevertheless, a greater thickness may be implemented.

Figure 3G:
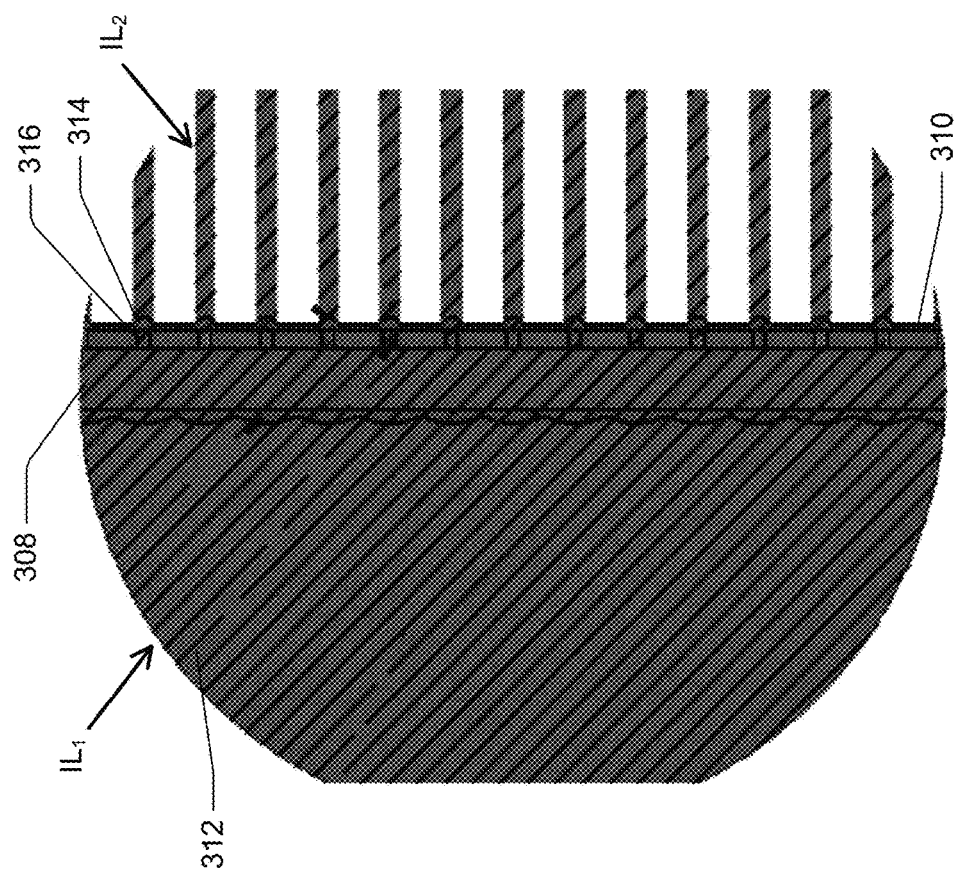
FIG. 3G illustrates a detail perspective of a cross-sectional view of the microlens array member in FIG. 3F, with a depiction of light passing through the microlens array member toward a sample, according to an embodiment of this disclosure.

Notably, FIGS. 3D and 3E depict first micro lenses 312 in an array on the exposed side of planar layer 308 (the uncoated side), and second micro lenses 314 are depicted in an array, in FIGS. 3E and 3G, on an exposed side of coating layer 310. First micro lenses 312 are larger than second micro lenses 314 and are configured to condense incoming excitation light beams from light source 102 to exit a corresponding hole 316, which holes 316 are aligned, respectively, with each first micro lens 312 and each second micro lens 314. In an embodiment, holes 316 may further include a filter therethrough which blocks IR and red light, but allows blue and green light, which is the opposite of the filtering ability of coating layer 310. Accordingly, array 300 may further include an array of holes 316, via which light may pass in a focused manner to minimize diffraction, as is more clearly depicted by the shaded (incoming light) in FIG. 3G. That is, first micro lens 312 focuses incoming light "$IL_1$" (i.e., excitation beams) down to a corresponding hole 316, and the incoming light "$IL_2$" exits via hole 316 and a corresponding second micro lens 314.

In an embodiment, each hole 316 in the array of holes 316 may have a diameter, respectively, of approximately 2 μm, or the diameter may range between about 1 μm to about 3 μm, for example, although smaller and larger diameter dimensions than those expressly stated here are contemplated.

Figure 3F:
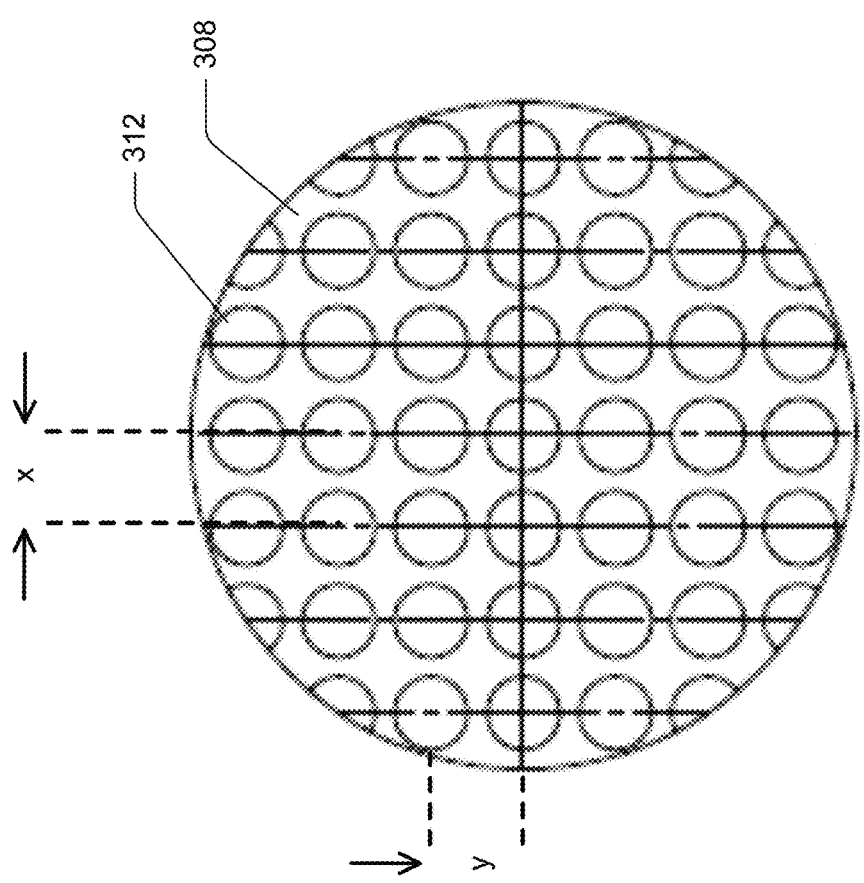
FIG. 3F illustrates a detail perspective of the planar view of a portion of the microlens array member in FIG. 3C according to an embodiment of this disclosure.

FIG. 3F depicts a planar view in close detail of the incoming light exposed side of array 300 on planar layer 308. Note that the array of first micro lenses 312 are depicted as spaced apart a distance x in a first direction and a distance y in a second direction that is transverse to the first direction. While x may be equal or approximately equal to y, it is contemplated that x and y may, in alternative embodiments, not be equal. In an embodiment, x and/or y may range from about 20 μm to about 50 μm apart, or about 30 μm to about 40 μm apart, for example. Inasmuch as the holes 316 are colinearly aligned with first micro lenses 312 and second micro lenses 314, the distance between any adjacent respective pairs of first micro lenses 312, second micro lenses 314, or holes 316, may be spaced apart by x and/or y distance across array 300.

Accordingly, depending on overall dimensions of the various component features of array 300, discussed above, an array 300 according to an embodiment of this disclosure may include more or less than about 160,000 micro array lenses, where a "micro array lens" may include a first micro lens 312 and a second micro lens 314 aligned with a hole 316. That is, in an embodiment, an array 300 may have 400 micro array lenses in each column of the array and 400 micro array lenses in each row of the array, for example. This is therefore a significant advancement over a known spinning disc confocal optical system that may have only 20,000 lenses to scan a sample, for example. The advancement, however, is not to be measured only as an increase in quantity, but further in the ability to increase image resolution and speed of production of an image of a sample.

Figure 3H:
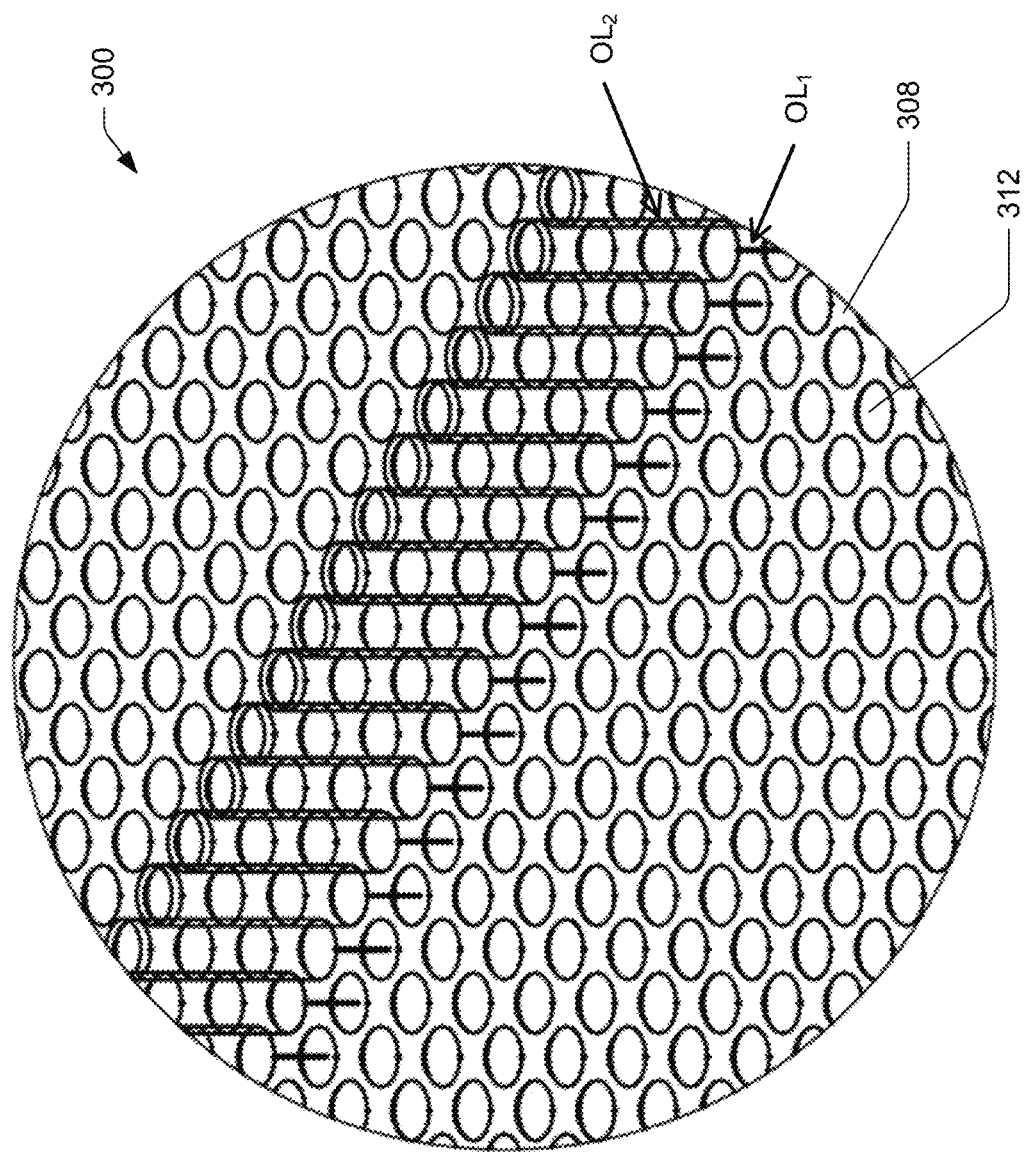
FIG. 3H illustrates a detail perspective of the isometric view of the microlens array member in FIG. 3B, with a depiction of light returning through the microlens array member away from the sample, according to an embodiment of this disclosure.
Figure 3I:
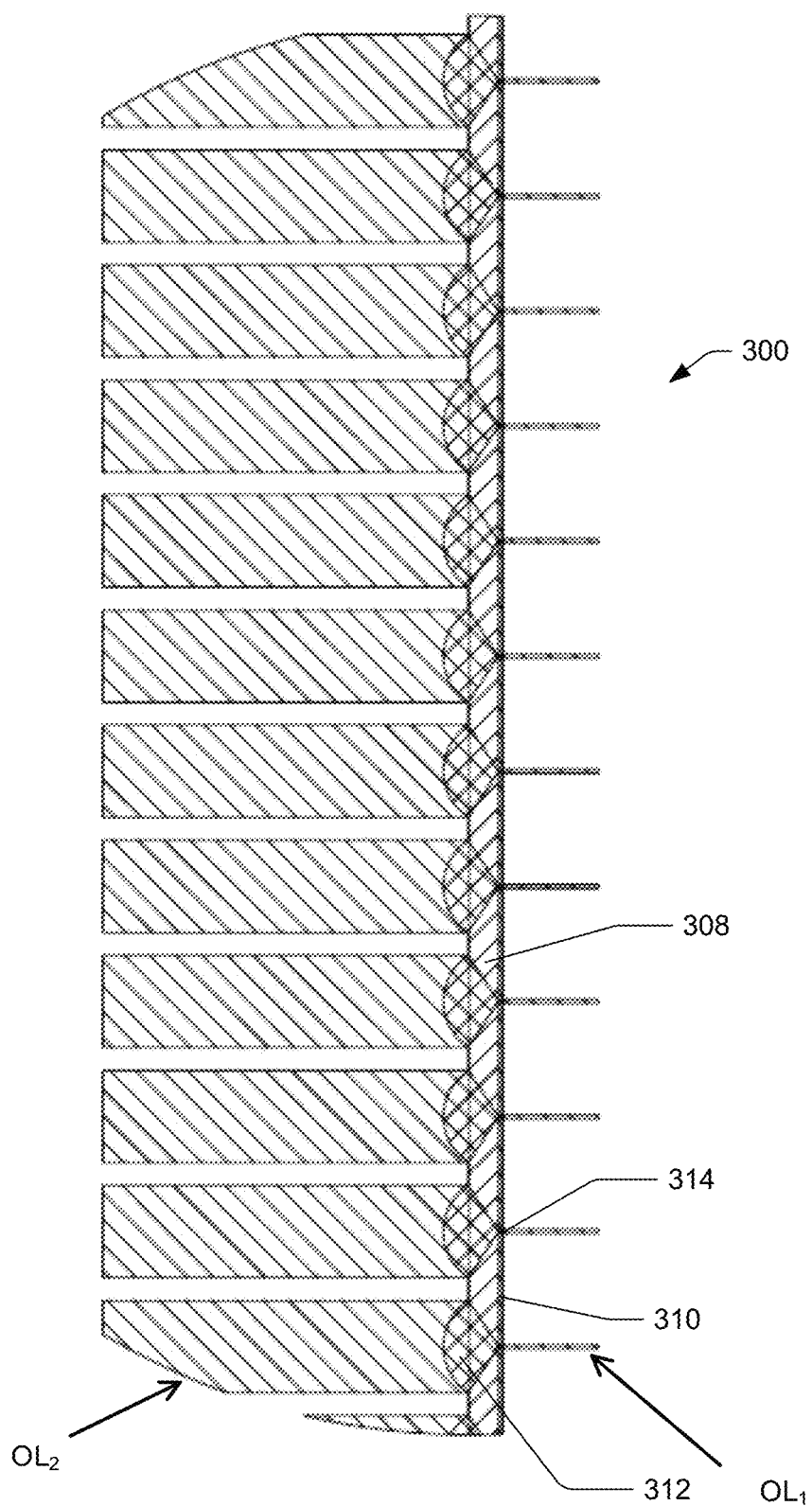
FIG. 3I illustrates a detail perspective of a cross-sectional side view of the microlens array member in FIG. 3H according to an embodiment of this disclosure.
Figure 4:
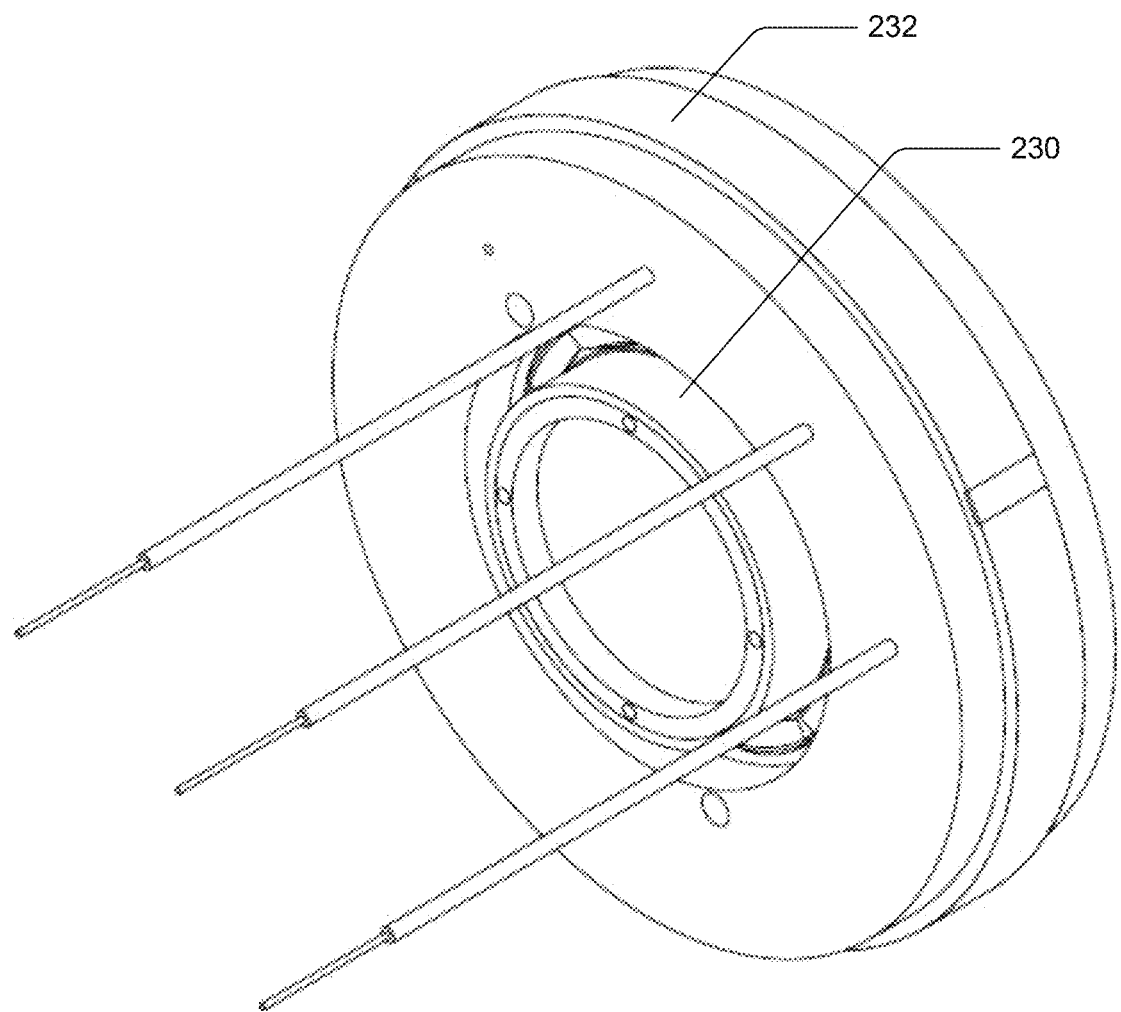
FIG. 4 illustrates an isometric view of a spinning polarizer according to an embodiment of this disclosure.

FIGS. 3H and 3I depict isometric and cross-sectional views, respectively, of array 300 including shading depicting outgoing light "OL" returning from sample 104 (i.e., emission beams) when passing through array 300. More specifically, outgoing light "$OL_1$" returns from sample 104 to pass through second micro lens 314 and exit toward camera 110 via first micro lens 312, at which point, first micro lens 312 expands the outgoing light "$OL_2$" while maintaining minimal diffraction, yet providing a finder dot scan and resolution of the image than known confocal optical systems. Further, the properties of coating layer 310 may pass through red light, while blocking blue and green light, and by coating holes 316 to have green light and blue light go through but blocking red and IR light, thus the coated area of holes 316 act as an array of light filter (i.e., "filter holes"). This will serve as a red and IR light blocking feature at the image plane of sample 104, as arrays of smaller than the diffraction limit of 200 nm. In an alternative embodiment, the principles above could provide improvements going down to 1 nm if holes 316 were sized down to 100 nm in combination with 100× objective lens at the location of second objective lens 114. Thus, an ultimate type super resolution optical microscope of 1 nm resolution may theoretically be reached with the above alternative embodiment.

As indicated herein above, the optical pathway includes a spinning polarizer 230 and a motor 232 to spin spinning polarizer 230. In an embodiment, an advantage of spinning polarizer 230 may include formation of a smaller beam of the light emitted from light source 102. Further, spinning polarizer 230 may spin at about 3000 RPM in the optical path after the light is emitted but before first objective lens 112. Accordingly, spinning polarizer 230 may clean up and enhance the light beam. Motor 232 surrounds spinning polarizer 230 so as to provide a planar, rotational spinning motion of spinning polarizer 230.

Figure 5:
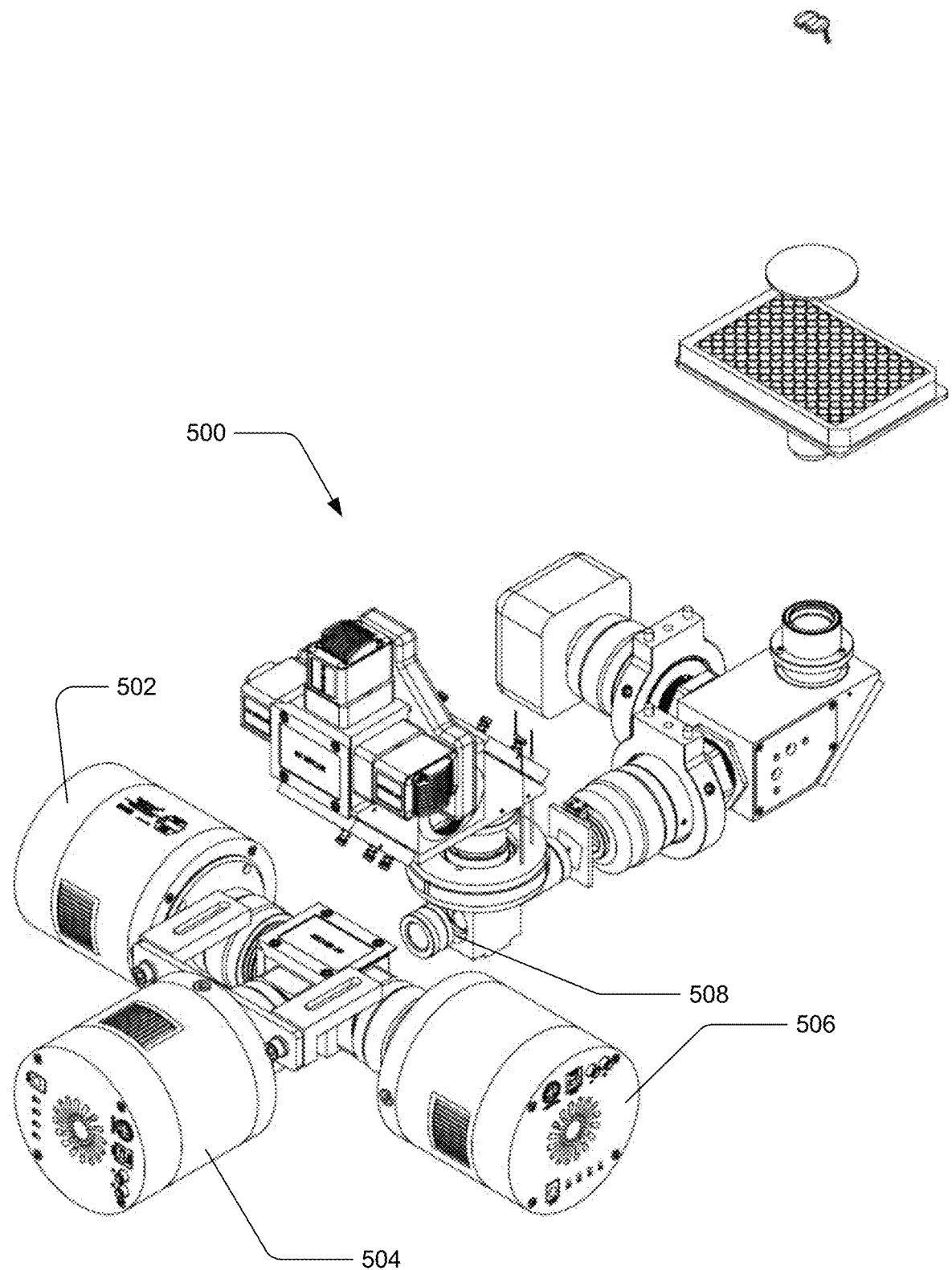
FIG. 5 illustrates an isometric view of a confocal optical system including more than one camera according to an embodiment of this disclosure.

FIG. 5 illustrates an isometric view of a confocal optical system 500 including more than one camera according to an embodiment of this disclosure. Specifically, FIG. 5 depicts a three-channel transmission structure, using a three-way dichroic prism implementing three cameras 502, 504, 506. Each of the cameras 502, 504, and 506 may be monochromatic cameras with an emission filter for 95% of the transmission rate at each fluorescent channel. In known confocal optical systems, the cameras tend to lose 50% of the transmission rate on a first camera and as much as 75% on a third camera. While other configurations are contemplated, as depicted, the three cameras 502, 504, and 506 may be arranged with a three-way dichroic prism beam splitter 508 and the emission filters mentioned above such that each camera receives the light and captures at 95% transmission rate a predetermined color portion of the light from sample 104.

Notably, any of the features described above with respect to FIGS. 1-4 of a confocal optical system with one camera, as depicted in FIG. 1, may be coupled or combined as appropriate with the system 500 having three cameras 502, 504, 506, and/or alternatively, a system may be configured to couple with more than three cameras by staging the three-way dichroic prism. That is, all possible combinations are considered to be within the scope of this disclosure.

CONCLUSION

Although several embodiments have been described in language specific to structural features and/or methodological acts, it is to be understood that the claims are not necessarily limited to the specific features or acts described. Rather, the specific features and acts are disclosed as illustrative forms of implementing the claimed subject matter.

What is claimed is:
1. A confocal optical system comprising:
a light source including an LED or a laser configured to be activated to emit light along an optical pathway;
a spinning polarizer disposed in the optical pathway such the light emitted from the light source passes through the spinning polarizer;
a first objective lens disposed in the optical pathway to receive and allow passage therethrough the light that passes through the spinning polarizer;
a solitary microlens array member disposed adjacent the first objective lens to receive the light that passes through the first objective lens, the microlens array member including a plate having a plurality of holes arranged in an array pattern; and a second objective lens disposed in the optical pathway to receive and allow passage therethrough to a sample the light that passes through the microlens array member, wherein the optical pathway is arranged such that, after reaching the sample, the light is directed back through the second objective lens, the microlens array, and the first objective lens as an emission beam to reach at least one camera which provides an image of a point on the sample.

2. The confocal optical system according to claim 1, wherein a diameter of the holes of the microlens array member ranges from about 1 micron to about 10 microns.

3. The confocal optical system according to claim 1, wherein a diameter of the holes of the microlens array member ranges from about 1 micron to about 5 microns.

4. The confocal optical system according to claim 1, wherein a diameter of the holes of the microlens array member ranges from about 1 micron to about 3 microns.

5. The confocal optical system according to claim 1, wherein a periphery of the microlens array member defines an area ranging from approximately 10 mm×10 mm to 20 mm×20 mm.

6. The confocal optical system according to claim 1, wherein a magnification range of the confocal optical system ranges between 4× times to 10,000× times magnification.

7. The confocal optical system according to claim 1, wherein the at least one camera includes a first camera, a second camera, and a third camera, thereby providing a three-channel transmission structure.

8. The confocal optical system according to claim 1, further comprising a piezo drive actuator coupled to the microlens array member to drive movement of the microlens array member.

9. An optical pathway of a confocal optical system, the optical pathway comprising:
 a first objective lens,
 a first imaging lens,
 a first reducing lens,
 a piezo-driven microlens array member including a plate having a plurality of filters arranged in an array pattern,
 a second objective lens,
 a second imaging lens,
 a second reducing lens, and
 a camera,
 wherein the piezo-driven microlens array member is confocal to an image plane of a sample when a sample is observed with the confocal optical system.

10. The optical pathway according to claim 9, wherein filters of the plurality of filters of the piezo-driven microlens array member include holes, a diameter of the holes ranging from about 1 micron to about 10 microns.

11. The optical pathway according to claim 9, wherein the camera includes a first camera, a second camera, and a third camera, thereby providing a three-channel transmission structure.

12. The optical pathway according to claim 11 further comprising a three-way dichroic prism beam splitter before the camera.

13. The optical pathway according to claim 9 further comprising a spinning polarizer disposed in the optical pathway such the light emitted from a light source passes through the spinning polarizer prior to entering the second objective lens.

14. The optical pathway according to claim 9, wherein light emitted from a light source passes through the second objective lens twice before reaching the camera.

15. The optical pathway according to claim 9, wherein the piezo-driven microlens array member includes:
 a planar layer,
 a first lens on each filter on a first side of the planar layer, and
 a second lens on each filter on a second side of the planar layer.

16. The optical pathway according to claim 15, wherein the planar layer is formed of a fused silica material.

17. A confocal optical system in an optical pathway, the confocal optical system comprising:
 a first objective lens disposed in the optical pathway to receive and allow passage therethrough the light from a light source;
 a solitary microlens array member disposed adjacent the first objective lens to receive the light that passes through the first objective lens, the microlens array member including a plate having a plurality of filter holes arranged in an array pattern; and
 a second objective lens disposed in the optical pathway to receive and allow passage therethrough to a sample the light that passes through the microlens array member, wherein the optical pathway is arranged such that, after reaching the sample, the light is directed back through the second objective lens, the microlens array, and the first objective lens as an emission beam to reach at least one camera which provides an image of a point on the sample.

18. The confocal optical system according to claim 17, wherein the plate of the microlens array member includes:
 a planar layer, and
 a coating layer on a coated side of the planar layer, the coating layer allowing red light and IR light to pass therethrough, and the coated side of the planar layer facing a direction of the second objective lens.

19. The confocal optical system according to claim 18, wherein the coating layer of the plate further blocks blue light and green light.

20. The confocal optical system according to claim 18, wherein the plurality of filter holes filter red light and IR light while allowing blue light and green light to pass therethrough.

* * * * *